United States Patent [19]

Adams et al.

[11] Patent Number: 4,961,548
[45] Date of Patent: Oct. 9, 1990

[54] TRANSLATING CENTER CONTROL SYSTEM

[75] Inventors: William Adams; R. H. DellaRovere, both of Torrance; Barbara G. J. Courter, El Segundo, all of Calif.

[73] Assignee: Rockwell International Corporation, El Segundo, Calif.

[21] Appl. No.: 288,502

[22] Filed: Dec. 21, 1988

[51] Int. Cl.$^5$ ............................................. B64C 13/06
[52] U.S. Cl. ................................... 244/118.5; 244/234
[58] Field of Search ...................... 244/122, 118.5, 234, 244/235; 280/775; 180/334, 78

[56] References Cited

U.S. PATENT DOCUMENTS

| | | | |
|---|---|---|---|
| 2,457,884 | 1/1949 | Fulton, Jr. et al. | 244/234 |
| 2,693,326 | 11/1954 | Lobelle | 244/122 AE |
| 3,129,605 | 4/1964 | Bonnell, Jr. et al. | 244/23 S |
| 3,170,711 | 2/1965 | Dunifon et al. | 280/87 |
| 3,302,478 | 2/1967 | Pauwels | 280/775 |
| 3,386,309 | 6/1968 | Reed et al. | 280/77 S |
| 3,693,997 | 9/1972 | Dreyer | 280/87 |
| 4,209,074 | 6/1980 | York | 180/78 |
| 4,667,901 | 5/1987 | Herndon | 244/122 |
| 4,778,133 | 10/1988 | Sakurai | 244/234 |

*Primary Examiner*—Galen Barefoot
*Attorney, Agent, or Firm*—Charles T. Silberberg; Lawrence N. Ginsberg

[57] ABSTRACT

A flight management console for an air vehicle. The console includes an elongated pedestal connected at a first end to a rigid support structure located forward and below the front instrument panel of the vehicle. The elongated pedestal is capable of translating up and aft or down and forward relative to the front instrument panel and is positioned forward of an associated seat along a plane which bisects that associated seat and is parallel to the pitch plane of the vehicle. Primary flight controls are mounted on a second end of the pedestal. The console includes adjustment means for positioning the pedestal at the desired location along the plane which is parallel to the pitch plane. Therefore, the console allows easy ingress, egress and control of the primary flight controls according to the individual crewmember's anthropometry.

3 Claims, 2 Drawing Sheets

TRANSLATING CENTER CONTROL SYSTEM

BACKGROUND OF THE INVENTION

Modern high performance fighter aircraft are capable of sophisticated flight manuevers, including tight turning and rapid acceleration/deceleration. These capabilities enable the aircraft to evade enemy missiles and rockets, and manuever for better advantage in close-in air-to-air combat. However, this improved aircraft manueverability and agility is counterproductive if the resulting forces imposed on the pilot are beyond human tolerances or degrade his capability to control the aircraft during these maneuvers. Conventional wisdom for dealing with the increased forces on the pilot has been to recline his seat to a laidback configuration (40°-70° seat back angle). Recent studies conducted by Rockwell International Corporation, the present assignee, have demonstrated, however, that equivalent increases in g-tolerance can be achieved with pilots leaning forward at angles only a fraction of those required for layback tolerance. For example, co-pending U.S. patent application Ser. No. 175,660, entitled "High G Protection System", assigned to Rockwell International Corp., discloses a seat restraint system for supporting the occupant in a leaned forward or crouched position. This results in a reduced hydrostatic column between the aorta and retina of the eye of the occupant. Reduction in the hydrostatic column relates directly to an increase in g-tolerance. The ability to withstand increased g forces (both high g and rapid onset rates) directly avoids G-induced Loss of Conciousness (GLOC).

Forward leaning enables the pilot to withstand increased g-forces, but at the expense of controller accessibility in conventionally configured fighter aircraft. Side-mounted or large displacement flight control stick and throttles are extremely awkward to use while in a forward lean position and/or during extreme aircraft dynamic manuevering loads. Current aircraft flight management philosophy is Hands-On-Throttle-And-Stick (HOTAS); i.e., continuous contact with the primary flight controls during critical portions of a mission (combat manuevers, takeoff and landing, etc.). HOTAS is difficult in a conventionally configured aircraft if the pilot is utilizing the forward lean.

In addition, the military services are increasing the size ranges for anthropometric accommodation in fighter aircraft from 5th and 95th percentiles to 1st to 99th percentiles, with the aim of increasing the available pool of prospective pilots (both male and female). Current control configurations cannot accommodate the extended size ranges of body dimensions (seated eye height, arm and leg reach) without complex seat adjustment.

Typically a pilot adjusts his seat for external vision over the nose of the aircraft and over the side of the aircraft. However, once the seat is adjusted for such an "over-the-nose" view, the crew member is unable to adjust his hand controls for that particular seat adjustment.

U.S. Pat. No. 3,170,711 issued to G. R. Dunifon, entitled "Movable Steering Column" discloses a movable steering column that may be displaced from a normal operative position to a displaced position for the purpose of easy access to and egress from the driver's seat of a motor vehicle. In addition, the invention provides an adjustable steering column that may be adjusted into an infinite number of operative and driving positions, preferably along a plane having a substantial vertical component. This latter feature permits the steering column to be adjusted for optimum steering ease and visibility for each individual vehicle operator.

U.S. Pat. No. 3,693,997, issued to H. Dreyer, entitled "Adjustable Steering Column For Motor Vehicles," discloses another adjustable steering column for a motor vehicle in which the position within the vehicle of a steering wheel attached to the upper end of the steering column can be readily adjusted by adjusting the overall length and the inclination of the adjustable steering column.

U.S. Pat. No. 4,209,074, issued to L. E. York, entitled "Adjustable Control Console," discloses an adjustable control console for a vehicle, including a base for attachment to a vehicle, a member, rigid mounting links pivotly interconnecting the base and the member in a manner like that of a parallelogram linkage to allow fore and aft movement of the member, at least one control element movably mounted on the member, and a rigid control link connected to the control element and extending there from toward the base, the links being selectively, simultaneously extensible to allow adjustment of the space in between the member and the base.

While the Dunifon, Dreyer and York patents provide for a range of driver sizes, they all address ground based vehicles exclusively, and with only the primary steering task accomplished by the device.

U.S. Pat. No. 4,667,901, issued to G. F. Herndon, entitled "Apparatus For Adjustably Mounting An Ejection Seat In An Aircraft," discloses an adjustable seat mounting to allow greater anthropometric accommodation in ejection seat equipped aircraft. However, only conventional upright posture and side mounted controllers are accommodated by that system, not the g-force tolerant forward lean. Additionally, the method disclosed by Herndon requires complex seat adjustment mechanisms which have the potential for failure during critical periods, such as ejection, which might prevent pilot escape.

OBJECT AND SUMMARY OF THE INVENTION

It is a principal object of the present invention to provide the crewmember with the ability to maintain continuous contact with the primary flight controls during any flight phase.

It is another object to allow adjustment of the primary flight controls for a range of crewmember anthropometry between the 1st and 99th percentiles.

It is yet another object to allow the crewmember to utilize the forward lean posture while maintaining contact with the primary flight controls.

Other objects, advantages and novel features of the present invention will become apparent from the following detailed description of the invention when considered in conjunction with the accompanying drawings.

These objects are achieved by the present invention which is a flight management console for an air vehicle. In its broadest aspects the flight management console includes an elongated pedestal connected at a first end to a rigid support structure located forward and below the front instrument panel, capable of translating up and aft or down and forward relative to the front panel. The pedestal is positionable forward of an associated seat along a plane which bisects the associated seat and is parallel to the pitch plane of the vehicle. Primary flight controls are mounted on a second end of the pedestal. Adjustment means are provided for positioning the pedestal at the desired location along the plane which is parallel to the pitch plane, the console thereby allowing easy ingress, egress and control of the primary flight controls, according to the individual crewmember's anthropometry. The flight management console provides the crewmember with the ability to maintain continuous contact with the primary flight controls during any flight phase. It is particularly adapted for use in a seating arrangement which utilizes the forward lean posture inasmuch as it permits the crewmember a degree of self support in high g maneuvers by allowing the crewmember's forearms and elbows to brace against his knees and thighs while in a forward lean posture.

BRIEF DESCRIPTION OF THE DRAWINGS

The same elements or parts throughout the figures of the drawings are designated by the same reference characters, while equivalent elements bear a prime designation.

DETAILED DESCRIPTION OF THE PREFERRED EMBODIMENT

Figure 1:
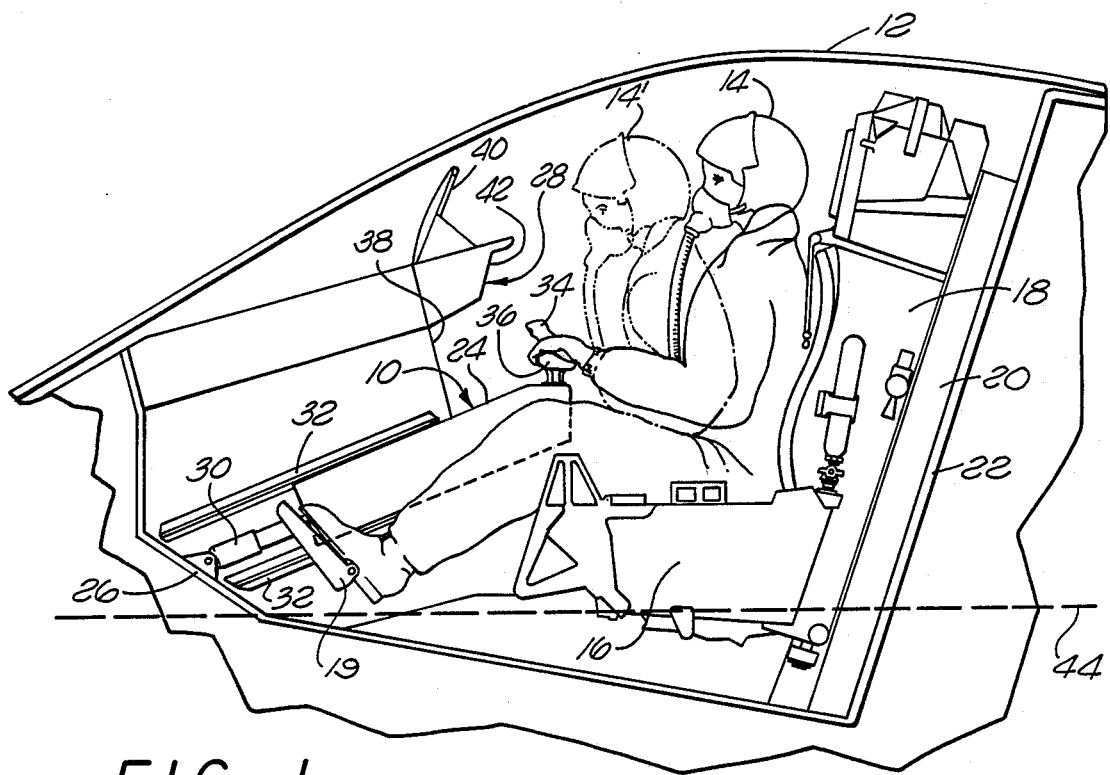
FIG. 1 illustrates a side view of the crewmember in an upright position and, in phantom, in a forward lean posture, utilizing the flight management console of the present invention.

Referring to the drawings and characters of reference marked thereon, the flight management console of the present invention is generally designated 10. The flight management console 10 is illustrated in its aircraft environment, including the canopy of the aircraft labeled 12. The crewmember 14 is shown seated upon an ejection seat assembly generally comprising a seat pan 16 and seat back 18. The crewmember's feet are positioned on a rudder pedal assembly 19. The ejection seat assembly is supported by ejection seat rails 20 attached to the bulkhead 22.

The elongated pedestal 24 is connected at a first end to a rigid support structure 26 located forward and below the front instrument panel 28 of the vehicle. The flight management console 10 also includes retraction means 30 connected at a first end of the pedestal 24 and to the rigid support structure 26 for retracting the console 10 forwardly under the front instrument panel 28 for safe ejection or other emergency egress. The rigid support structure 26 may be part of a floor piece or other rigid aircraft structure. The retraction means 30 may be a pneumatic, hydraulic or pyrotechnic device. The elongated translating pedestal 24 moves within a housing 32 which is also connected to a rigid portion of the aircraft structure.

The elongated pedestal 24 has primary flight controls mounted on its second end. These primary flight controls typically include a flight control stick 34 and a throttle/thrust controller 36.

Generally, the front instrument panel 28 includes a face panel 38 and a head up display (HUD). The HUD generally includes a combiner glass 40 and an optics box 42.

The elongated pedestal 24 is capable of translating up and aft or down and forward relative to the front instrument panel 28. Preferably, the elongated pedestal 24 translates up and aft or down and forward at an angle between 25° and 35° from the longditudinal axis 44 i.e. fuselage reference line, of the vehicle.

Figure 2:
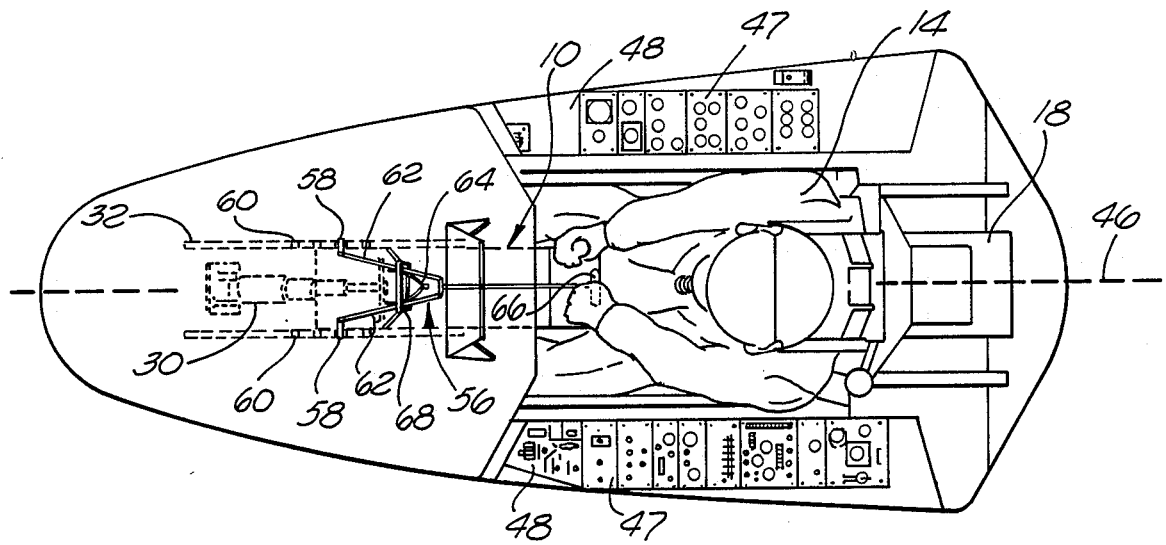
FIG. 2 is a plan view of the crewmember utilizing the present invention.

Referring now to FIG. 2, it can be seen that the flight management console 10 is positioned forward of its associated seat 16,18 along a plane 46 which bisects that associated seat 18 and is parallel to the pitch plane of the vehicle. The flight management console 10 is located between the crewmember's knees during operation. The console 10 is held in position by adjustment means generally designated 56. Retention pins 58 are inserted into longitudinally spaced-apart holes 60 in the wall of the pedestal housing 32. The pins 58 can be removed from the holes 60 to allow the console 10 to be positioned to accommodate the pilot's anthropometry. Each pin 58 is attached to a first end of a pin bar 62. The pin bars 62 are partially separated by a spring 64 and joined at their ends to a handle 66. The adjustment handle 66, located on the second end of the console 10 and below the primary flight controls 34,36, is attached to the junction of the pin bars 62. The pins bars 62 and spring 64 are compressed by compression ring 68, which is fastened to the inside of pedestal 24. It is emphasized that the details set forth above with respect to the adjustment means 56 are merely an illustrative example of such a means, the details of which are not significant to the essential novelty of the invention. The view of FIG. 2 also illustrates the crewmember 14 position relative to the side consoles 47, and auxiliary panels 48.

Figure 3:
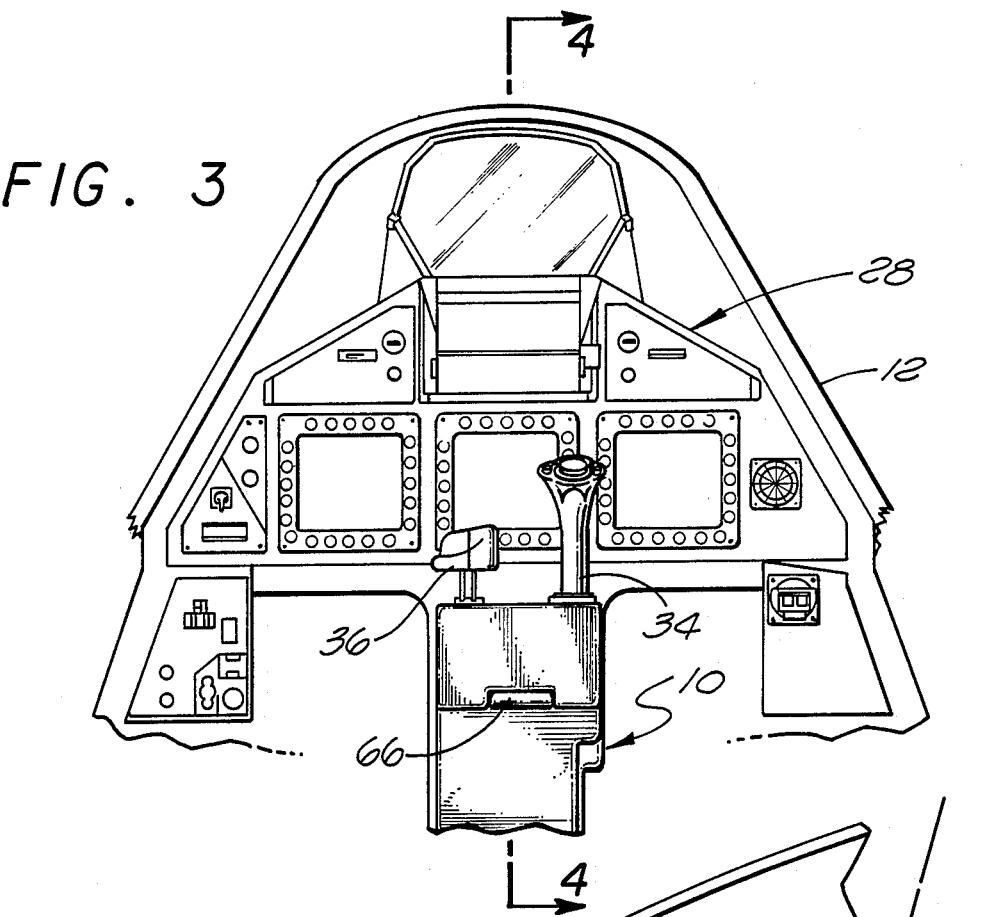
FIG. 3 is a face on view of an instrument panel of an aircraft, illustrating the flight management console of the present invention.

FIG. 3 is a face on view of the front instrument panel 28, the relationship of the flight management primary flight controls 34,36 and the front instrument panel 28 being illustrated.

Figure 4:
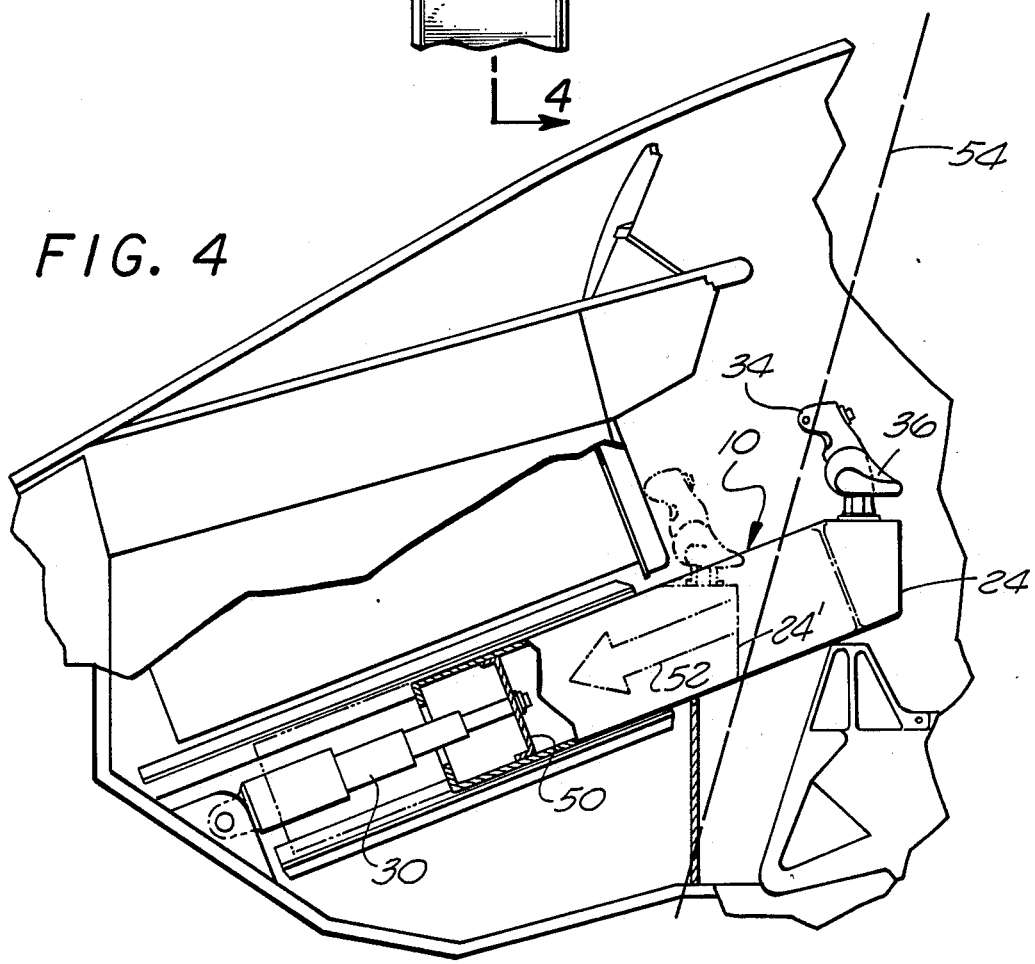
FIG. 4 is a view along line 4—4 of FIG. 3, illustrating the positionability of the pedestal of the present invention.

Referring now to FIG. 4, the retraction means 30 is shown bolted to a rigid cross member 50 within the pedestal 24. It is emphasized that this figure is meant only to be a schematic example of a retraction system and that many other implementations may be employed.

During operation, the crewmember would ingress the vehicle and position himself within the seat 16,18, with his feet on the rudder pedals 19. He would then adjust his seat 16,18 to permit external vision over the nose of the aircraft and over the side of the aircraft. Once the seat 16,18 is adjusted for such an "over-the-nose" view the crewmember releases the adjustment handle 66 and brings the console 10 up and aft toward himself. When the crewmember has positioned the console 10 in a location that accommodates his particular anthropometric dimensions and preferred flight posture, he releases the adjustment handle 66 to secure the retention pins 58 and thus maintain the console 10 in that position. At this point, the crewmember is enabled to perform any mission.

Referring back now to FIG. 1, during normal flight the crewmember 14 has continual control of the aircraft in a conventional upright posture shown in solid lines. For missions incorporating high speed maneuvers that engender a high g environment the crewmember can assume a forward lean posture, illustrated in phantom lines 14'. He is still provided continuous contact with the primary flight controls 34,36 during critical portions of such a mission and is provided a degree of self support by allowing his forearms and elbows to brace against his knees and thighs while in this forward lean posture.

In an emergency situation requiring ejection or other emergency egress, the retraction means 30 pulls the elongated pedestal 24 forwardly under the front instrument panel 28 permitting a clear path for emergency escape.

Referring back now to FIG. 4, in solid lines, the console 10 is shown in an operational position. Phantom lines 24' and arrow 52 illustrate the console 10 retracted outside of the ejection path indicated by broken line 54.

Obviously, many modifications and variations of the present invention are possible in light of the above teachings. It is, therefore, to be understood that, within the scope of the appended claims, the invention may be practiced otherwise than as specifically described.

For example, although a single pilot example is illustrated, it is understood that a similar center flight management console system may be utilized for an aircraft using a tandem or side-by-side configuration. In those situations, the principals involved in the present invention may be utilized by each crewmember utilizing a flight management console, each a flight management console located along a plane which bisects his associated seat and still parallel to the pitch plane of the vehicle.

What is claimed and desired to be secured by Letters Patent of the U.S. is:

1. A flight management console for an air vehicle in which a g-tolerance increasing forward lean posture is utilized comprising:
   (a) an elongated, center-mounted pedestal connected at a first end to a rigid support structure located forward and below the front instrument panel of the vehicle capable of translating up and aft or down and forward relative to said front instrument panel, said center-mounted pedestal being positioned forward of an associated seat along a plane which bisects said associated seat and is parallel to the pitch plane of the vehicle;
   (b) primary flight controls mounted on a second end of said pedestal, said primary flight controls including a flight control stick and throttle/thrust controller; and
   (c) adjustment means for securely and selectively positioning the pedestal at a desired location along said plane which is parallel to said pitch plane, said console thereby providing maximum adjustment for pilot anthropometric accommodation and continuous contact with the primary flight controls during critical portions of a mission, thereby permitting the pilot a degree of self support in high g maneuvers by allowing the pilot's forearms and elbows to brace against his knees and thighs while in a forward lean posture.

2. The flight management console of claim 1 wherein said elongated pedestal translates up and aft of down and forward at an angle between 25° and 35° from the longitudinal axis of the vehicle.

3. The flight management console of claim 1 further including retraction means connected at said first end of the pedestal and to the vehicle for retracting the console forwardly under the front instrument panel for safe ejection or other emergency egress.

* * * * *